(12) United States Patent
Pailler et al.

(10) Patent No.: US 11,208,020 B2
(45) Date of Patent: Dec. 28, 2021

(54) SEAT FOR TRANSPORT VEHICLE AND ASSOCIATED TRANSPORT VEHICLE

(71) Applicant: SpeedInnov, Paris (FR)

(72) Inventors: Christophe Pailler, Perigny (FR); Christophe Beauseigneur, Verines (FR)

(73) Assignee: SPEEDINNOV, Paris (FR)

( * ) Notice: Subject to any disclaimer, the term of this patent is extended or adjusted under 35 U.S.C. 154(b) by 0 days.

(21) Appl. No.: 17/024,446

(22) Filed: Sep. 17, 2020

(65) Prior Publication Data

US 2021/0078476 A1   Mar. 18, 2021

(30) Foreign Application Priority Data

Sep. 18, 2019 (FR) ...................................... 1910285

(51) Int. Cl.
*B60N 3/00* (2006.01)
*B60R 7/04* (2006.01)
*B60N 2/24* (2006.01)
*B63B 29/04* (2006.01)

(52) U.S. Cl.
CPC .............. *B60N 3/004* (2013.01); *B60R 7/043* (2013.01); *B60N 2/242* (2013.01); *B63B 2029/043* (2013.01)

(58) Field of Classification Search
CPC ........ B60N 3/004; B60N 2/242; B60R 7/043; B63B 2029/043
USPC .................................................. 297/188.05
See application file for complete search history.

(56) References Cited

U.S. PATENT DOCUMENTS

| 3,586,099 A | | 6/1971 | Collie | |
|---|---|---|---|---|
| 4,836,602 A | * | 6/1989 | d'Almada Remedios | B64D 11/0007 297/146 |
| 5,720,515 A | * | 2/1998 | Haffner | G09F 21/04 297/188.04 |
| 6,994,401 B1 | * | 2/2006 | Fischer | A47C 7/725 297/146 |
| 10,065,741 B1 | * | 9/2018 | Pozzi | B60Q 3/20 |

(Continued)

FOREIGN PATENT DOCUMENTS

| CN | 103223880 A | 7/2013 |
|---|---|---|
| CN | 205661328 U | 10/2016 |

(Continued)

OTHER PUBLICATIONS

INPI Rapport de Recherche Préliminaire for Patent Application No. FR 1910285, Apr. 30, 2020, 2 pp.

*Primary Examiner* — Mark R Wendell
(74) *Attorney, Agent, or Firm* — Soquel Group LLC

(57) ABSTRACT

A seat including a backrest defining a first surface and a second surface, the second surface including an opening, the backrest including a table movable between a folded position in which the table closes off the opening, and a deployed position in which the opening is clear, the backrest including a locking device operable between a locked configuration and an unlocked configuration, the locking device being configured, in the locked configuration, to keep the table in its folded position, and, in the unlocked configuration, to allow a movement of the table toward its deployed position, wherein the locking device includes a lock that can be actuated in order to operate the locking device between the locked configuration and the unlocked configuration.

12 Claims, 3 Drawing Sheets

(56) References Cited

U.S. PATENT DOCUMENTS

2007/0138848 A1 6/2007 Schurg et al.
2015/0020715 A1* 1/2015 Pajic .................. B64D 11/0638
 108/3

FOREIGN PATENT DOCUMENTS

| FR | 2802070 A1 | 6/2001 |
|----|------------|--------|
| WO | 2011070515 A1 | 6/2011 |
| WO | 2018057117 A1 | 3/2018 |
| WO | 2018190810 A1 | 10/2018 |

* cited by examiner

SEAT FOR TRANSPORT VEHICLE AND ASSOCIATED TRANSPORT VEHICLE

CROSS-REFERENCE TO RELATED APPLICATION

This application claims priority of French Patent Application No. 19 10285, filed on Sep. 18, 2019.

FIELD OF THE INVENTION

The present invention relates to a seat for a transport vehicle, including a backrest defining a first surface intended to receive the back of a passenger and a second surface opposite the first surface, the second surface including an opening for access to at least one cavity arranged between the first surface and the second surface, the backrest including a table movable between a folded position in which the table closes off the opening for access to the cavity, and a deployed position in which the opening for access to the cavity is clear.

BACKGROUND OF THE INVENTION

Such a seat is known in the state of the art. It provides a horizontal support surface, i.e., a table, on which a passenger can arrange personal affairs and work, while providing the possibility of folding the table so as to free space to facilitate the movement of the passengers.

However, such seats are not fully satisfactory. Indeed, it is common for a passenger to be away from his seat briefly, for example to go to the restroom, but it is necessary for the passenger to take his personal affairs with him, since the latter risk being stolen if they are left on the seat.

SUMMARY OF THE DESCRIPTION

One aim of the present invention is to provide a seat that reduces the risk of theft of passengers' property.

To that end, the invention relates to a seat of the aforementioned type, wherein the backrest includes a locking device operable between a locked configuration and an unlocked configuration, the locking device being configured, in the locked configuration, to keep the table in its folded position while preventing any movement of the table toward its deployed position, and, in the unlocked configuration, to allow a movement of the table toward its deployed position. The locking device includes a lock that may be actuated in order to operate the locking device between the locked configuration and the unlocked configuration.

The seat according to the invention may include one or more of the following features, considered alone or according to any technically possible combination(s):
- the lock is a digital lock, able to be actuated by a digital code assigned to a corresponding passenger.
- the cavity has a volume greater than 150 mm×100 mm×15 mm, preferably greater than 250 mm×200 mm×30 mm, preferably substantially equal to 350 mm×300 mm×40 mm.
- the opening for access to the cavity is dimensioned to receive the table, the table having a surface greater than or substantially equal to a surface of the opening.
- the second surface includes a frame arranged below the opening, the digital lock being arranged on the frame.
- the backrest, advantageously the table of the backrest, includes a device for controlling a light associated with the seat.
- the backrest includes a light device configured to turn on when the table moves from its folded position toward its deployed position, the light device advantageously being positioned in the upper part of the cavity.
- the table includes a first part mounted articulated on the second surface of the backrest, the first part being mounted rotatably along a first axis relative to the second surface, and a second part mounted articulated on the first part, the second part being mounted rotatably relative to the first part, along a second axis parallel to the first axis.
- the second part defines a first face and a second face opposite the first face, the second part being rotatable between an unfolded position, in which the first face has an angle substantially equal to 180° with the first part, and a folded position, in which the first face is in direct contact with the first part.

The invention also relates to a transport vehicle, including a transport seat as described above.

BRIEF DESCRIPTION OF THE DRAWINGS

The invention will be better understood upon reading the following description, provided solely as an example and with reference to the appended drawings, in which.

DETAILED DESCRIPTION

Figure 1:
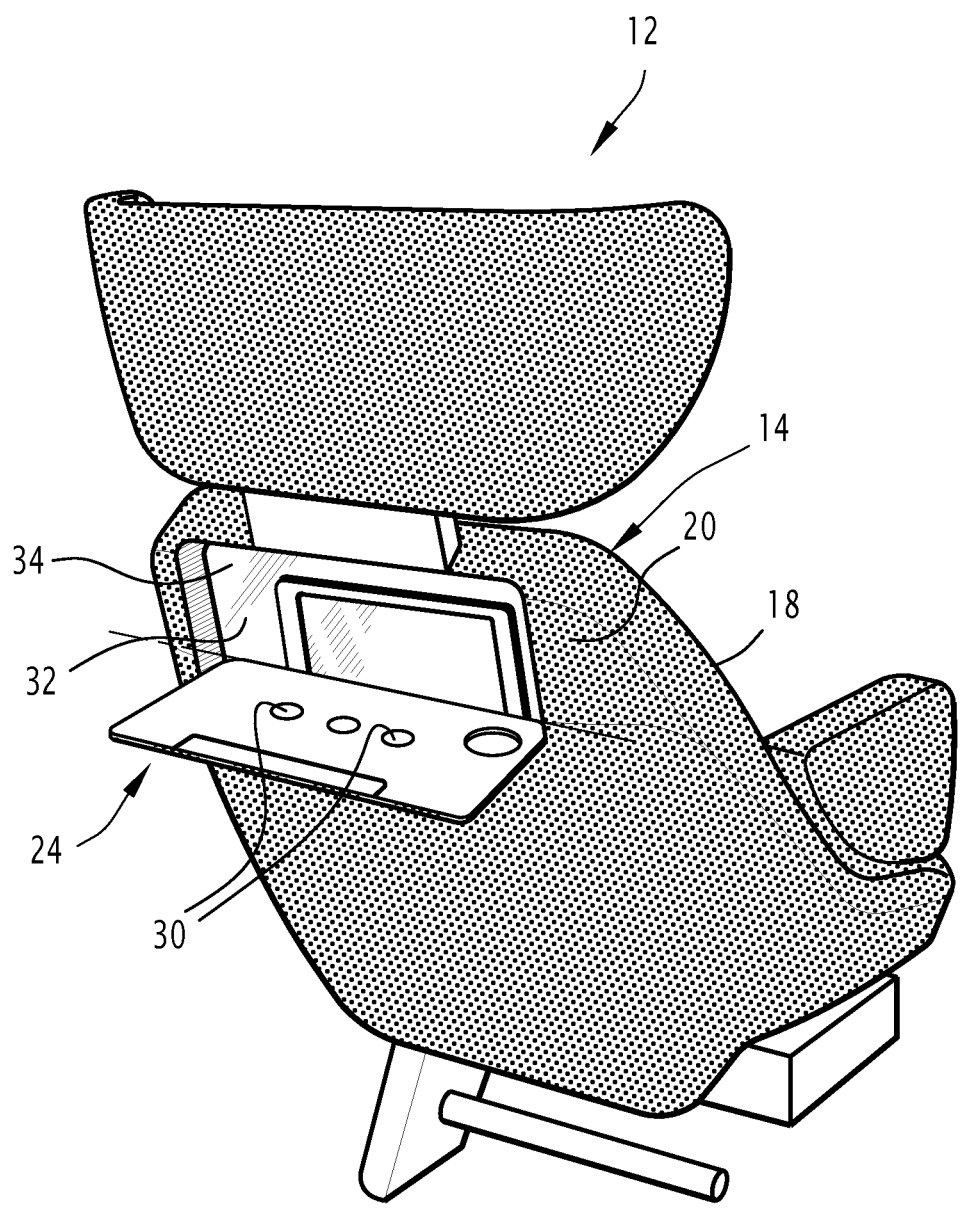
FIG. 1 is a perspective view of the backrest of a seat according to the invention, the table being in its deployed position.
Figure 2:
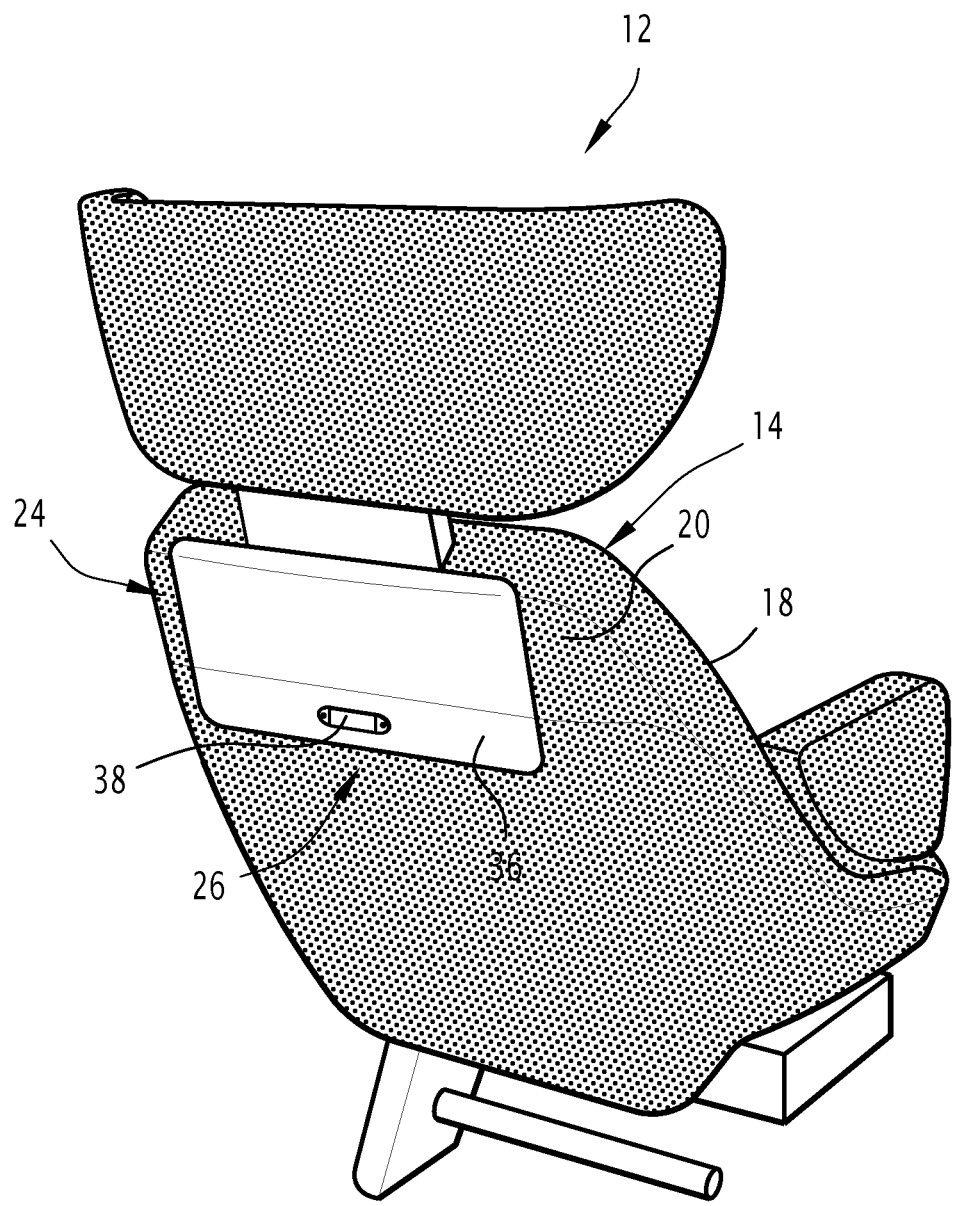
FIG. 2 is a view similar to FIG. 1, the table being in its folded position.

FIGS. 1 and 2 show a seat 12 of a transport vehicle. The transport vehicle is in particular a public transport vehicle, for example a rail transport vehicle. In a variant, the transport vehicle is a bus or a ship.

Seat 12 includes a backrest 14 and a cushion (not shown in the figures). Backrest 14 defines a first surface 18 intended to receive the back of a first passenger and a second surface 20 opposite first surface 18. Second surface 20 of backrest 14 is typically oriented toward a second passenger, seated behind the first passenger.

Backrest 14 includes, on the side of second surface 20 of the backrest, a folding table 24 and a locking device 26.

Advantageously, backrest 14, and more specifically folding table 24, further includes a device 30 for controlling a light associated with the seat, in particular located in the upper part of a cavity 34.

In a variant, backrest 14 includes a control device for controlling a light located in the upper part of cavity 34, the control device being able to control activation of the light when the table is in the deployed position and deactivation of the light when the table is in the folded position. The control device is, for example, a switch able to cooperate with a wall of cavity 34 to go from an ON position, in which the light is activated, in the deployed position, to an OFF position, in which the light is deactivated when the table is folded and obstructs access to the cavity.

Second surface 20 includes an opening 32 for access to at least one cavity 34 arranged between first surface 18 and second surface 20 of backrest 14.

In particular, opening 32 allows access to a space formed between first surface 18 and second surface 20, this space forming cavity 34. Opening 32 is preferably substantially rectangular.

Cavity 34 is further laterally delimited by two lateral walls extending between first surface 18 and second surface 20, vertically by at least a bottom wall and an upper wall extending between first surface 18 and second surface 20.

Cavity 34 has a volume greater than about height 350 mm×width 300 mm×depth 40 mm. Thus, cavity 34 is particularly suitable for receiving personal affairs, such as a tablet, a book or a laptop computer.

Opening 32, for access to cavity 34, is dimensioned to receive table 24, as described below.

Advantageously and in reference to FIG. 2, second surface 20 is provided with a frame 36 arranged below opening 32, i.e., below cavity 34.

Table 24 is movable between a folded position and a deployed position. When table 24 is in the folded position, table 24 closes off access to cavity 34. When table 24 is in the deployed position, access to cavity 34 is clear.

Table 24 has an upper surface or surface substantially even with the surface delimited by opening 32. Thus, when table 24 is in the folded position, it completely closes off the opening and therefore access to cavity 34.

Advantageously, the surface of table 24 is less than or equal to 110% of the surface delimited by opening 32.

Table 24 has an angle, for example, greater than 45°, advantageously greater than 75°, and preferably substantially equal to 90°, between its folded and deployed positions.

Locking device 26 is operable between a locked configuration and an unlocked configuration. Locking device 26 is configured in order, in the locked configuration, to keep table 24 in its folded position while preventing any movement of the table 24 toward its deployed position. Locking device 26 is configured, in the unlocked configuration, to allow a movement of table 24 toward its deployed position.

Advantageously, locking device 26 includes a digital lock 38, which can be actuated in order to operate locking device 26 between the locked configuration and the unlocked configuration.

Advantageously, digital lock 38 may be actuated by a digital code assigned to a corresponding passenger. Thus, the position of table 24 between its folded and deployed positions is only changeable by a specific passenger. This ensures that only the passenger installed in the seat facing second surface 20 may access cavity 34, and therefore that he may store his personal affairs safely in cavity 34. The assigned digital code is, for example, printed on a ticket of the corresponding passenger.

According to the embodiment shown in FIG. 2, digital lock 38 is arranged on frame 36. Thus, when table 24 is in the deployed position, the upper part of cavity 34 is accessible to a passenger. This configuration makes it possible to facilitate arrangement and recovery of the personal affairs in cavity 34.

Lighting control device 30, when present, is configured to be accessible when table 24 moves from its folded position to its deployed position, so that the passenger controls a light located in the upper part of cavity 34, while the lighting device, when present, is configured to turn on when table 24 moves from its folded position to its deployed position.

Owing to the invention described above, the passenger may ensure safety of his personal affairs without risk of theft by arranging them in cavity 34, then locking table 24 in the folded position via locking device 26, even if the passenger temporarily leaves his seat 12.

According to one variant of the invention, table 24 includes a first part 40 and a second part 42. First part 40 is mounted articulated on second surface 20 of backrest 14.

First part 40 is mounted rotatably along a first axis A-A' relative to second surface 20. First axis A-A' is, for example, substantially horizontal or substantially vertical.

Second part 42 is mounted articulated on first part 40. Second part 42 is mounted rotatably relative to first part 40, along a second axis B-B' parallel to first axis A-A'.

Second part 42 defines a first face 44 and a second face 46 opposite first face 44. Second part 44 is rotatable between an unfolded position, in which first face 44 has an angle substantially equal to 180° with first part 40, and a folded position, in which first face 44 is in direct contact with first part 40.

Making table 24 in two articulated parts makes it possible to arrange a larger work surface (in the unfolded position of the second part) than that imposed by the size of opening 32 delimiting cavity 34.

Figure 3:
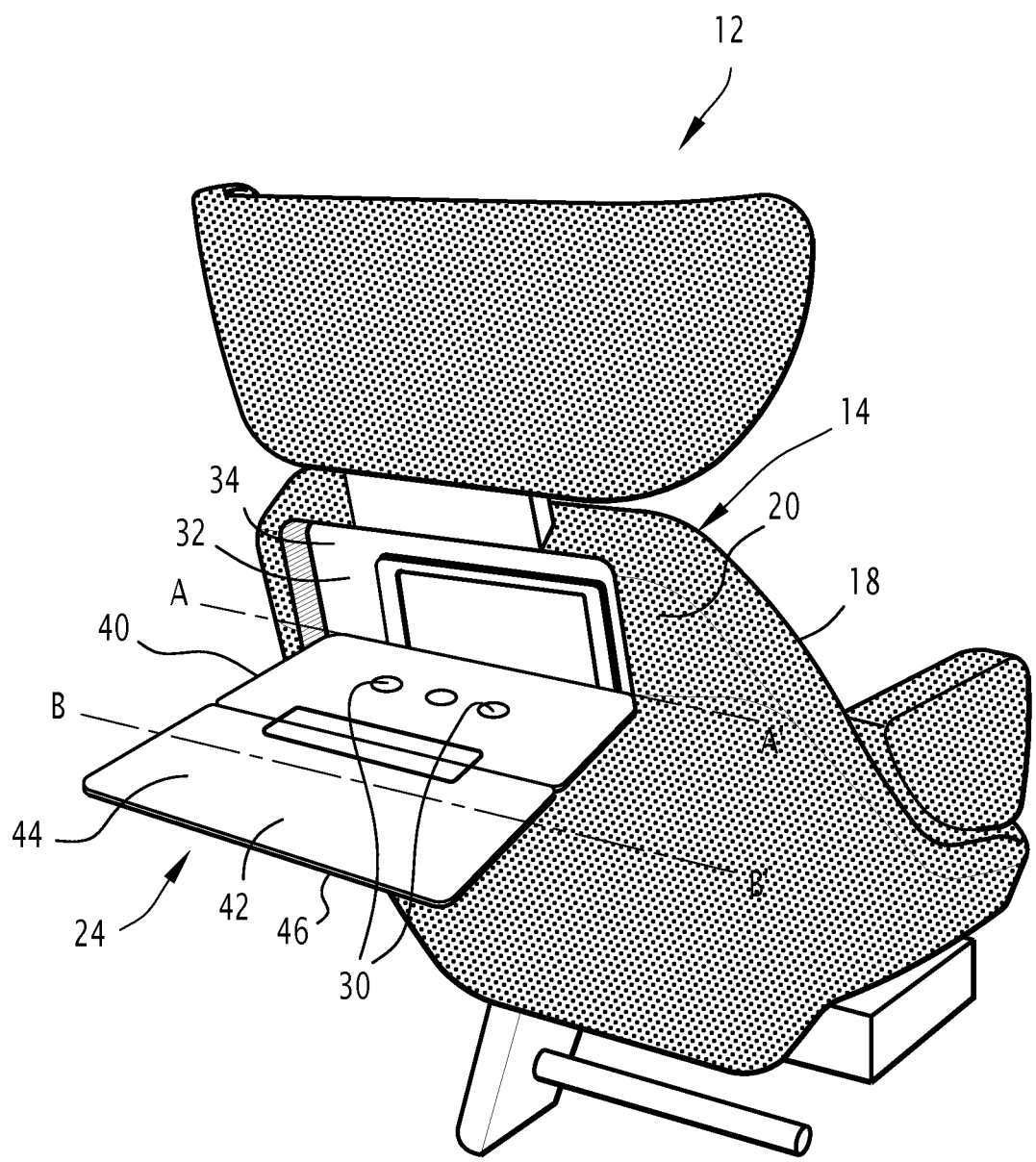
FIG. 3 is a view similar to FIG. 1, the illustrated table being according to a variant of the invention.

According to the configuration illustrated in FIG. 3, when table 24 is in the deployed position and second part 44 is in the unfolded position, first face 44 of second part 42 is oriented upward and is intended to receive passengers' objects. Second face 46 of second part 42 is then oriented downward.

When table 24 is in the deployed position and second part 44 is in the folded position, second face 46 of second part 42 is oriented upward. Thus, in this configuration, second face 42 may continue to receive passengers' personal objects while decreasing the total surface of table 24.

The invention claimed is:

1. A seat for a transport vehicle, comprising a backrest defining a first surface intended to receive the back of a passenger and a second surface opposite the first surface, the second surface comprising an opening for access to at least one cavity arranged between the first surface and the second surface, the second surface comprising a frame arranged below the opening, the backrest comprising:
a table movable between a folded position in which the table closes off the opening for access to the at least one cavity, and a deployed position in which the opening for access to the at least one cavity is clear; and
a locking device operable between a locked configuration and an unlocked configuration, the locking device being configured, in the locked configuration, to keep said table in its folded position while preventing any movement of said table toward its deployed position, and, in the unlocked configuration, to allow a movement of said table toward its deployed position, the locking device comprising a lock that may be actuated by a passenger assigned to a seat facing the second surface in order to operate the locking device between the locked configuration and the unlocked configuration, the lock being arranged below the opening, the lock comprising a digital lock, able to be actuated by a digital code assigned to the passenger, the digital lock being arranged on the frame.

2. The seat of a transport vehicle according to claim 1, wherein the at least one cavity has dimensions respectively greater than 150 mm×100 mm×15 mm.

3. The seat of a transport vehicle according to claim 2, wherein the at least one cavity has dimensions respectively greater than 250 mm×200 mm×30 mm.

4. The seat of a transport vehicle according to claim 2, wherein the at least one cavity has dimensions substantially equal to 350 mm×300 mm×40 mm.

5. The seat of a transport vehicle according to claim 1, wherein the opening for access to the at least one cavity is dimensioned to receive said table, said table having a surface greater than or substantially equal to a surface of the opening.

6. The seat of a transport vehicle according to claim 1, wherein said backrest comprises a device for controlling a light associated with the seat.

7. The seat of a transport vehicle according to claim 6, wherein said table of said backrest comprises a device for controlling a light associated with the seat.

8. The seat of a transport vehicle according to claim 1, wherein said backrest comprises a light device configured to turn on when said table moves from its folded position toward its deployed position, the light device being positioned in the upper part of the cavity.

9. The seat of a transport vehicle according to claim 1, wherein said table comprises:
- a first part mounted articulated on the second surface of said backrest, the first part being mounted rotatably along a first axis relative to the second surface; and
- a second part mounted articulated on the first part, the second part being mounted rotatably relative to the first part, along a second axis parallel to the first axis.

10. The seat of a transport vehicle according to claim 9, wherein the second part defines a first face and a second face opposite the first face, the second part being rotatable between an unfolded position, in which the first face has an angle substantially equal to 180° with the first part, and a folded position, in which the first face is in direct contact with the first part.

11. A transport vehicle, comprising a transport seat according to claim 1.

12. A seat for a transport vehicle, comprising a backrest defining a first surface intended to receive the back of a passenger and a second surface opposite the first surface, the second surface comprising an opening for access to at least one cavity arranged between the first surface and the second surface, the backrest comprising:
- a table movable between a folded position in which the table closes off the opening for access to the at least one cavity, and a deployed position in which the opening for access to the at least one cavity is clear;
- a locking device operable between a locked configuration and an unlocked configuration, the locking device being configured, in the locked configuration, to keep said table in its folded position while preventing any movement of said table toward its deployed position, and, in the unlocked configuration, to allow a movement of said table toward its deployed position, the locking device comprising a lock that may be actuated by a passenger assigned to a seat facing the second surface in order to operate the locking device between the locked configuration and the unlocked configuration, the lock comprising a digital lock, able to be actuated by a digital code assigned to the passenger; and
- a light device configured to turn on when said table moves from its folded position toward its deployed position, the light device being positioned in the upper part of the cavity.

* * * * *